US011018561B2

(12) United States Patent
Dawidowicz

(10) Patent No.: US 11,018,561 B2
(45) Date of Patent: May 25, 2021

(54) SEGMENTED MAGNETIC CORE

(71) Applicant: The Government of the United States, as represented by the Secretary of the Army, Washington, DC (US)

(72) Inventor: Edward Dawidowicz, Jackson, NJ (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/901,035

(22) Filed: Jun. 15, 2020

(65) Prior Publication Data

US 2020/0313523 A1      Oct. 1, 2020

Related U.S. Application Data

(62) Division of application No. 15/344,611, filed on Nov. 7, 2016, now Pat. No. 10,720,815.

(51) Int. Cl.
| | |
|---|---|
| *H02K 1/14* | (2006.01) |
| *H02K 15/00* | (2006.01) |
| *H02K 15/02* | (2006.01) |
| *H02K 1/27* | (2006.01) |
| *H02K 41/03* | (2006.01) |

(52) U.S. Cl.
CPC .......... *H02K 15/0006* (2013.01); *H02K 1/14* (2013.01); *H02K 1/141* (2013.01); *H02K 1/2706* (2013.01); *H02K 15/022* (2013.01); *H02K 41/031* (2013.01)

(58) Field of Classification Search
CPC ...... H02K 15/0006; H02K 1/14; H02K 1/141; H02K 1/2706; H02K 15/022; H02K 41/031
See application file for complete search history.

(56) References Cited

U.S. PATENT DOCUMENTS

| | | | | |
|---|---|---|---|---|
| 5,729,071 | A * | 3/1998 | Steiner | H02K 1/14 310/172 |
| 6,700,288 | B2 * | 3/2004 | Smith | H02K 1/2773 310/156.38 |
| 7,755,245 | B2 * | 7/2010 | Prosdocimi | H02K 1/141 310/216.023 |
| 8,680,739 | B2 * | 3/2014 | Aoyama | H02K 1/141 310/216.074 |

* cited by examiner

*Primary Examiner* — Naishadh N Desai
(74) *Attorney, Agent, or Firm* — Ronald Krosky

(57) ABSTRACT

Various embodiments associated with a segmented magnetic core are described. The segmented magnetic core can be made up of multiple singular structures so as to allow an individual singular structure to be removed with ease and without disturbing another magnetic core. This modular core design allows for a significant reduction in motor housing weight due to compatibility of the design with lightweight materials and the potential absence of extensive housing when so designed. This modular core design can be incorporated into a motor or a generator and this modular core design can be accomplished, in one example, by way of stacking and/or interlocking employing low cost assembly. In one example, a motor or a generator uses sensors to detect an operational failure in a magnetic core, notifying a user early of the failure.

20 Claims, 12 Drawing Sheets

SEGMENTED MAGNETIC CORE

CROSS-REFERENCE

This application is a divisional application of, and claims priority to, U.S. application Ser. No. 15/344,611 filed on Nov. 7, 2016. U.S. application Ser. No. 15/344,611 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

Electric motors and generators function with moving mechanical parts. Due to the presence of moving parts, there is significant potential for electric motors and generators to malfunction and/or degrade. Replacement of broken parts, including magnetic cores, can be cumbersome and costly due to the act of disassembling various motor components to reach a faulty component.

SUMMARY

In one embodiment, a system can comprise a first singular structure comprising a first member and a second member and a second singular structure comprising a third member and a fourth member. The first member and the second member can intersect at an angle less than 180 degrees as can the third member and the fourth member. The first member and the third member can be configured to align together to form part of a magnetic core and to be at least partially surrounded by a coil to convert an energy.

In another embodiment, a motor can comprise a first singular structure comprising a first member and a second member. The motor also can comprise a second singular structure comprising a third member and a fourth member. Additionally, the motor can comprise a coil and a rotor comprising a magnet at a first edge. The first member and the second member can intersect at an angle significantly less than 180 degrees as can the third member and the fourth member. The first member and the third member can be configured to align together to form part of a magnetic core and can be configured to be at least partially surrounded by the coil. The first singular structure and the second singular structure can be configured to be removed from the magnetic core without disassembling another magnetic core of the motor. Application of a voltage across the coil can cause an electric current to flow through the coil and produce a magnetic flux such that the rotor rotates to convert an electrical energy into a mechanical energy.

In yet another embodiment, a generator can comprise a first singular structure comprising a first member and a second member. The generator can also comprise a second singular structure comprising a third member and a fourth member. In addition, the generator can comprise a coil and a rotor comprising a magnet at a first edge. The first member and the second member can intersect at an angle significantly less than 180 degrees as can the third member and the fourth member. The first member and the third member can be configured to align together to form part of a magnetic core and can be configured to be at least partially surrounded by the coil. The first singular structure and the second singular structure can be configured to be removed from the magnetic core without disassembling another magnetic core of the generator. The rotor can be configured to rotate to cause a magnetic flux, which produces an electric current that generates a voltage across the coil such that mechanical energy of the rotor rotation is converted into electrical energy as the voltage (e.g., the rotor can be configured to rotate to cause a time varying magnetic flux pass through an aligned magnetic core to induce a voltage across the coil such that mechanical energy of the rotor rotation is converted into electrical energy as the voltage across the coil).

DETAILED DESCRIPTION

Figure 1:
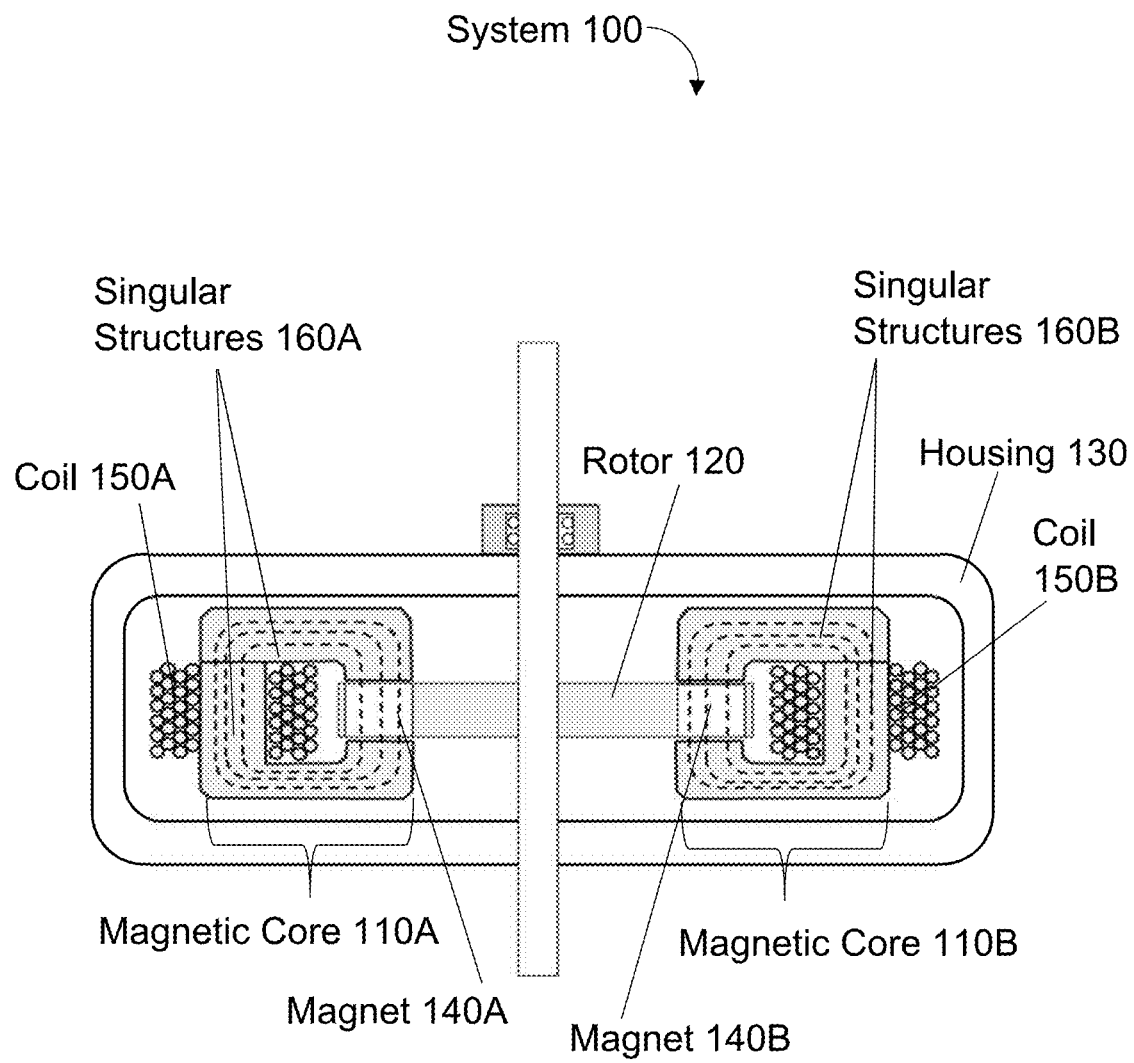
FIG. 1 illustrates one embodiment of a motor and/or generator cross section comprising two magnetic cores, a rotor, and a housing.

A segmented magnetic core can be used to extend the longevity of an electric motor. This can be accomplished through use of a core that is easily assembled and disassembled due to a modular design so that individual parts can be repaired/replaced. In this design, the segmented magnetic core can comprise two or more singular structures. To improve efficiency of energy transfer, the gap between a permanent magnet and the flux carrying core, and the magnetic path must be minimized. Traditionally, motors with a minimized air gap are made of two halves and have magnetic path run through the housing and shaft. The disadvantage of such configurations is longer magnetic path, massive housing, ferric losses (eddy currents) and strong forces holding housing halves together.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a cross section of a system 100 comprising two magnetic cores 110A and 110B, a rotor 120, and a housing 130. The system 100, including the housing 130, can implement in different manners (e.g., as a motor or as a generator). The housing 130 can be made of a relatively light nonferrous material. The housing 130 can retain the two magnetic cores 110A and 110B and the rotor 120. On opposite edges of the rotor 120 can be magnets 140A and 140B. The magnetic core 110A can individually comprise two singular structures 160A and the magnetic cores 110B can individually comprise two singular structures 160B. This allows the magnetic cores 110A and 110B to be of a modular design. This modular magnetic core design can facilitate core assembly and disassembly, which is advantageous in the event a singular structure 160A/B breaks or is damaged. The system 100 can function as a motor, such that when coils 150A and 150B are energized, a magnetic flux can be produced that in turn opposes the magnets 140 A/B, mounted on the rotor 120, forcing the rotor 120 into rotation. The system 100 can function as a generator, such as when mechanical torque applied to the rotor 120 rotates the rotor 120 as the magnets 140A and 140B induce voltage into the coils 150A and 150B.

Figure 2:
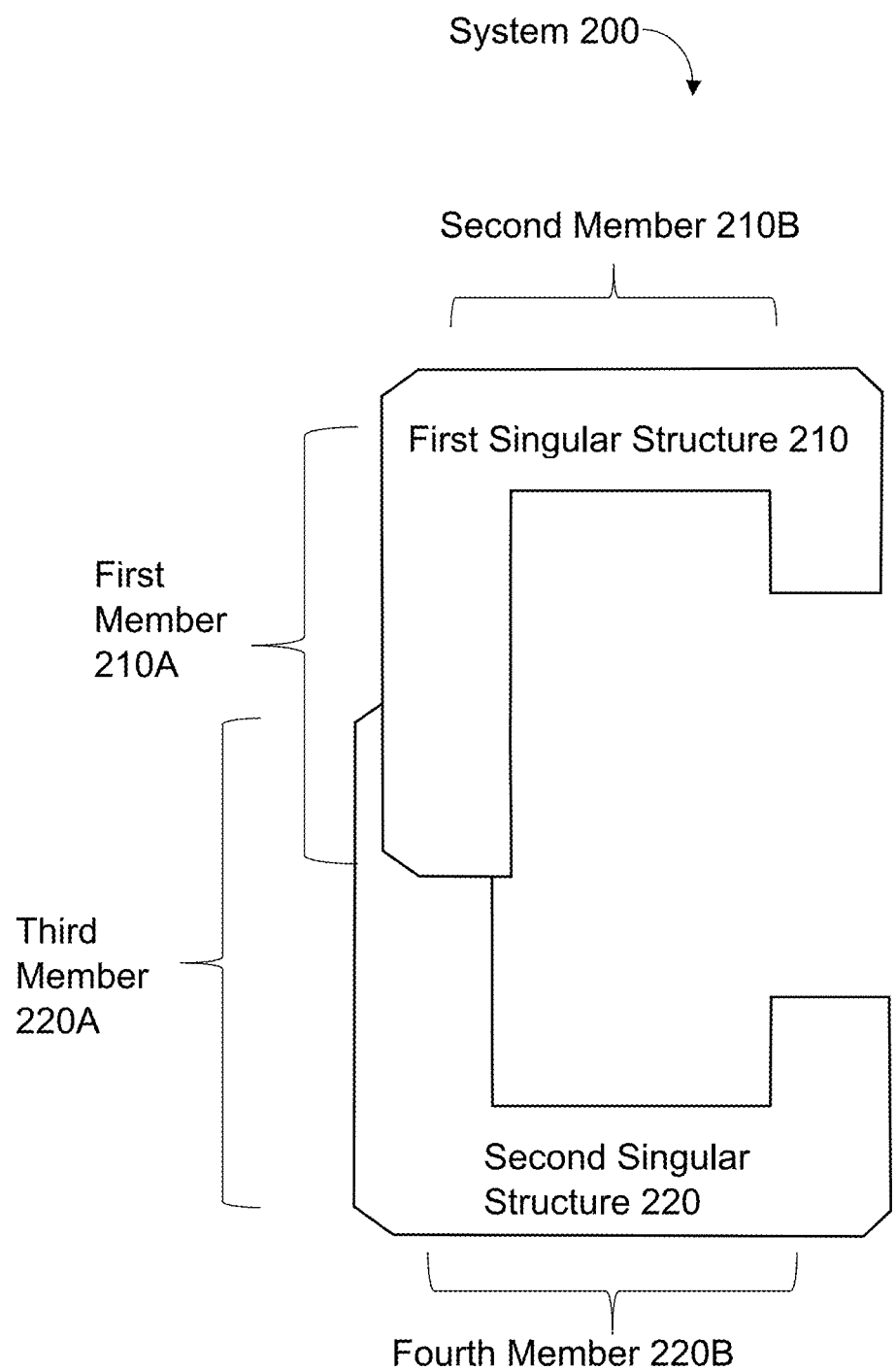
FIG. 2 illustrates one embodiment of a system comprising two singular structures.

FIG. 2 illustrates one embodiment of a system 200 comprising a first singular structure 210 and a second singular structure 220. The first singular structure 210 can comprise a first member 210A and a second member 210B, while the second singular structure 220 can comprise a third member 220A and a fourth member 220B. The first member 210A and the third member 210B can intersect at an angle significantly less than 180 degrees (e.g., about 90 degrees), as can the third member 220A and the fourth member 220B. The first singular structure 210 and the second singular structure 220 can be coupled together to form part of one of the magnetic cores 110A or 110B of FIG. 1. In one embodiment, the first member 210A and the third member 220A can stack with one another, while in another embodiment, the first member 210A and the third member 220A can interlock with one another.

In the embodiment in which the members stack, the first member 210A and the third member 220A individually can have a first thickness. The second member 210B and the fourth member 220B individually can have a second thickness. The second thickness can be about twice as thick as the first thickness. The first member 210A and the third member 220A can be configured to stack with one another to create part of the magnetic core 110A or 110B of FIG. 1, such that the magnetic core 110A or 110B has a roughly uniform thickness. Using complementary thicknesses reduces an air gap (which exists between singular structures 160A/B of the magnetic core 110A/B of FIG. 1), which in turn increases magnet to coil coupling efficiency. The second member 210B and the fourth member 220B can be configured to not stack with one another.

Figure 3:
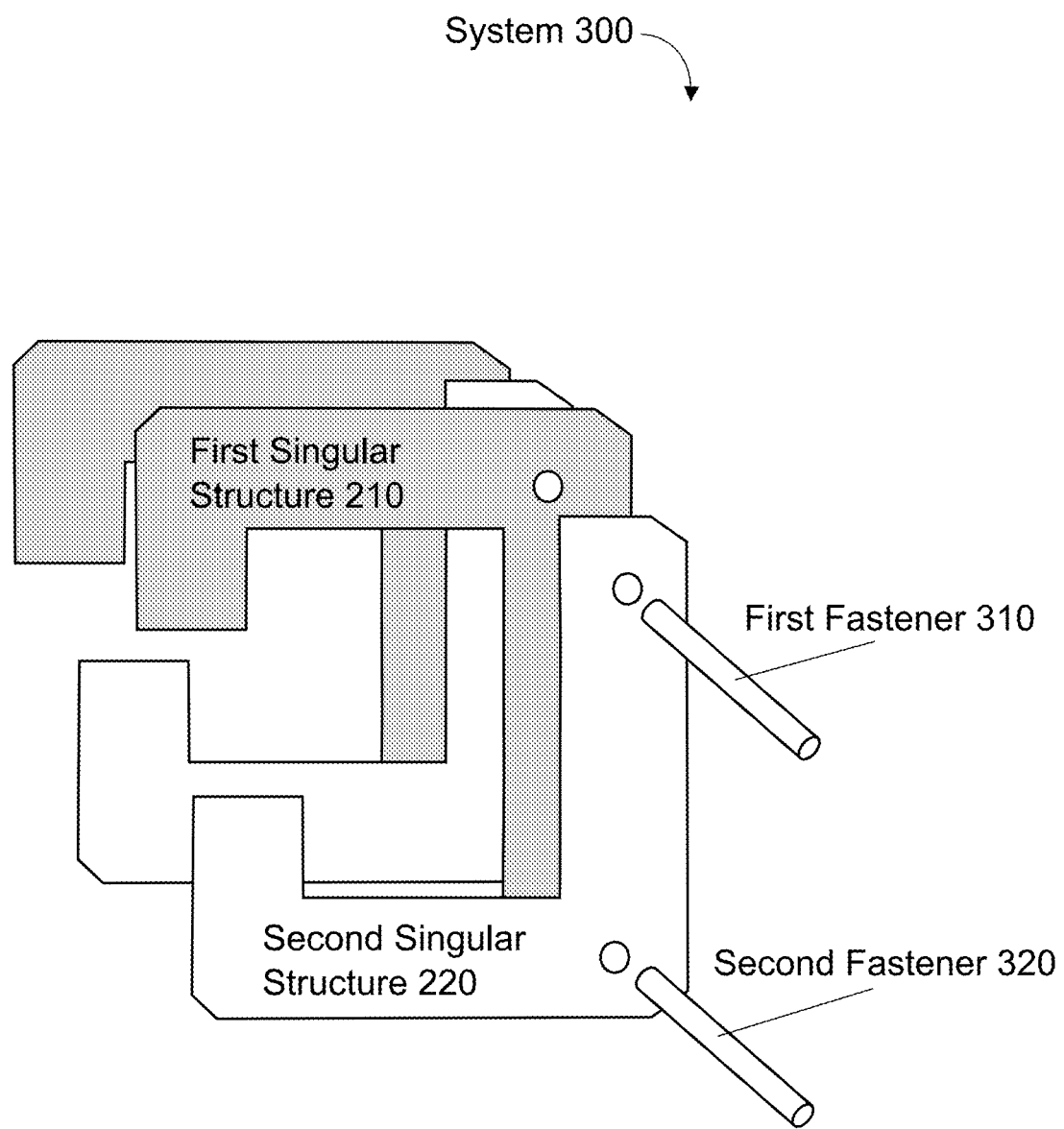
FIG. 3 illustrates one embodiment of a system comprising singular structures that stack with one another, a first fastener, and a second fastener.

FIG. 3 illustrates one embodiment of a system 300 comprising singular structures 160 of FIG. 1 that can stack with one another, including a first singular structure 210 and a second singular structure 220. In one embodiment, the singular structures 210 and 220 can be secured together by a first fastener 310 and a second fastener 320 (fasteners 310 and 320 can be configured so they are removable). A person or a machine can create the magnetic core 110A or 110B of FIG. 1 through stacking. In the event of damage to one or more singular structure(s), the fasteners 310 and 320 can be removed, the damaged singular structure(s) can be removed, a new singular structure(s) can be installed, and the fasteners 310 and 320 can be reinserted.

Figure 4:
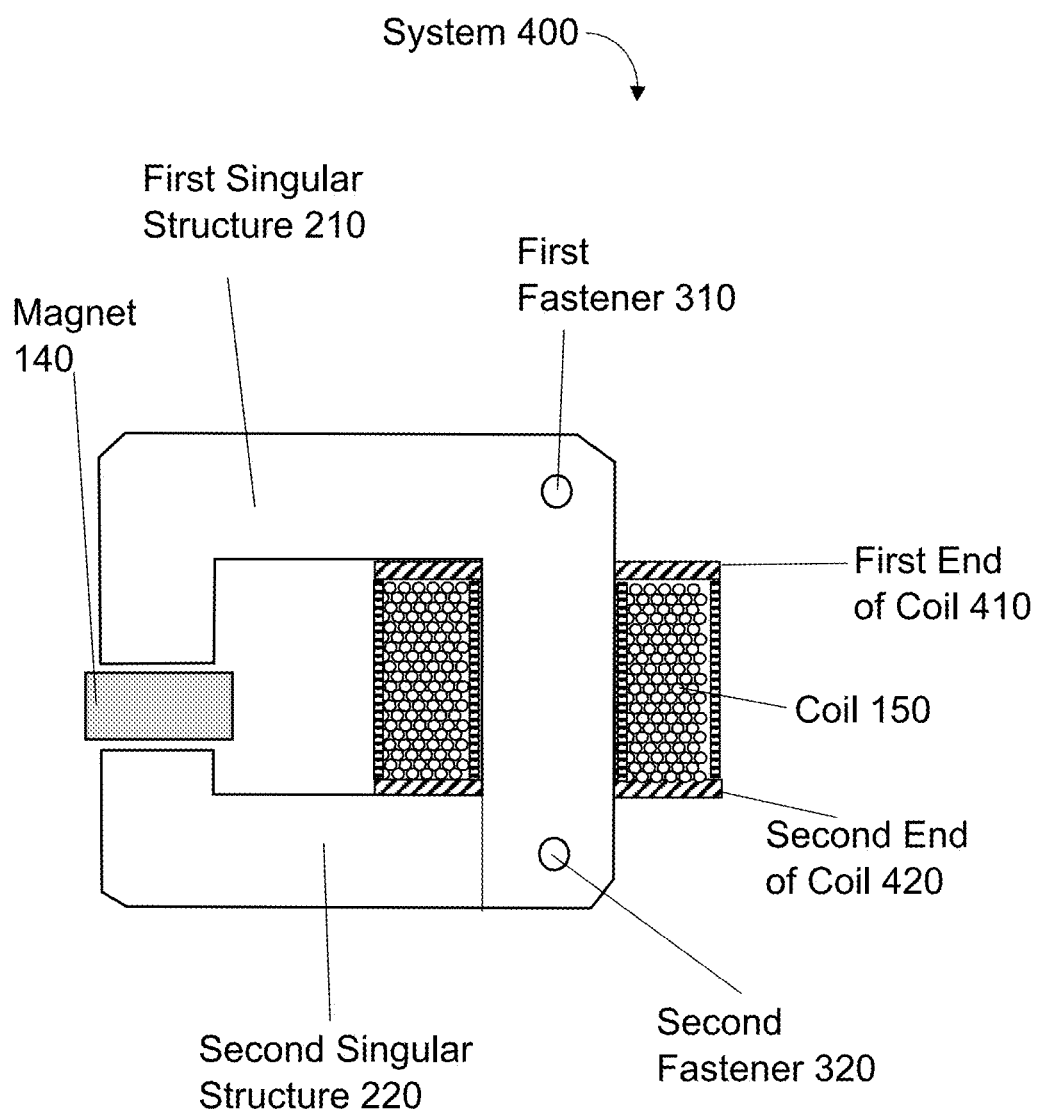
FIG. 4 illustrates one embodiment of a system cross section comprising a first singular structure, a second singular structure, the first fastener, the second fastener, a magnet, and a coil.

FIG. 4 illustrates one embodiment of a cross section of a system 400 comprising the first singular structure 210, the second singular structure 220, a magnet 140, a coil 150 comprising a first end 410 and a second end 420, the first fastener 310, and the second fastener 320. The first singular structure 210 and the second singular structure 220 can be at least partially surrounded by the coil 150 to be used to convert an energy. In one embodiment, the first fastener 310 can be inserted substantially perpendicularly through the first singular structure 210 and through the second singular structure 220 outside of the first end of the coil 410 (e.g., and not within the coil 150). The second fastener 320 can be inserted substantially perpendicularly through the first singular structure 210 and through the second singular structure 220 outside of the second end of the coil 420 (e.g., and not within the coil 150). Insertion of the fasteners 310 and 320 outside of the first and second ends of the coil 410 and 420, respectively, can allow for removal of the first singular structure 210 and/or the second singular structure 220 (e.g., in the event of breakage) with relative ease. It also can allow for ease of removal of the fasteners 310 and 320 (e.g., because the fasteners are not inserted the coil footprint).

When the magnet 140 approaches the magnetic core (e.g., which itself can have magnetic properties), repulsion between magnets can occur. A device (e.g., a clamp) can be used to hold the magnetic core in place to prevent the repulsion from dislodging the magnetic core and/or the approaching magnet.

Figure 5:
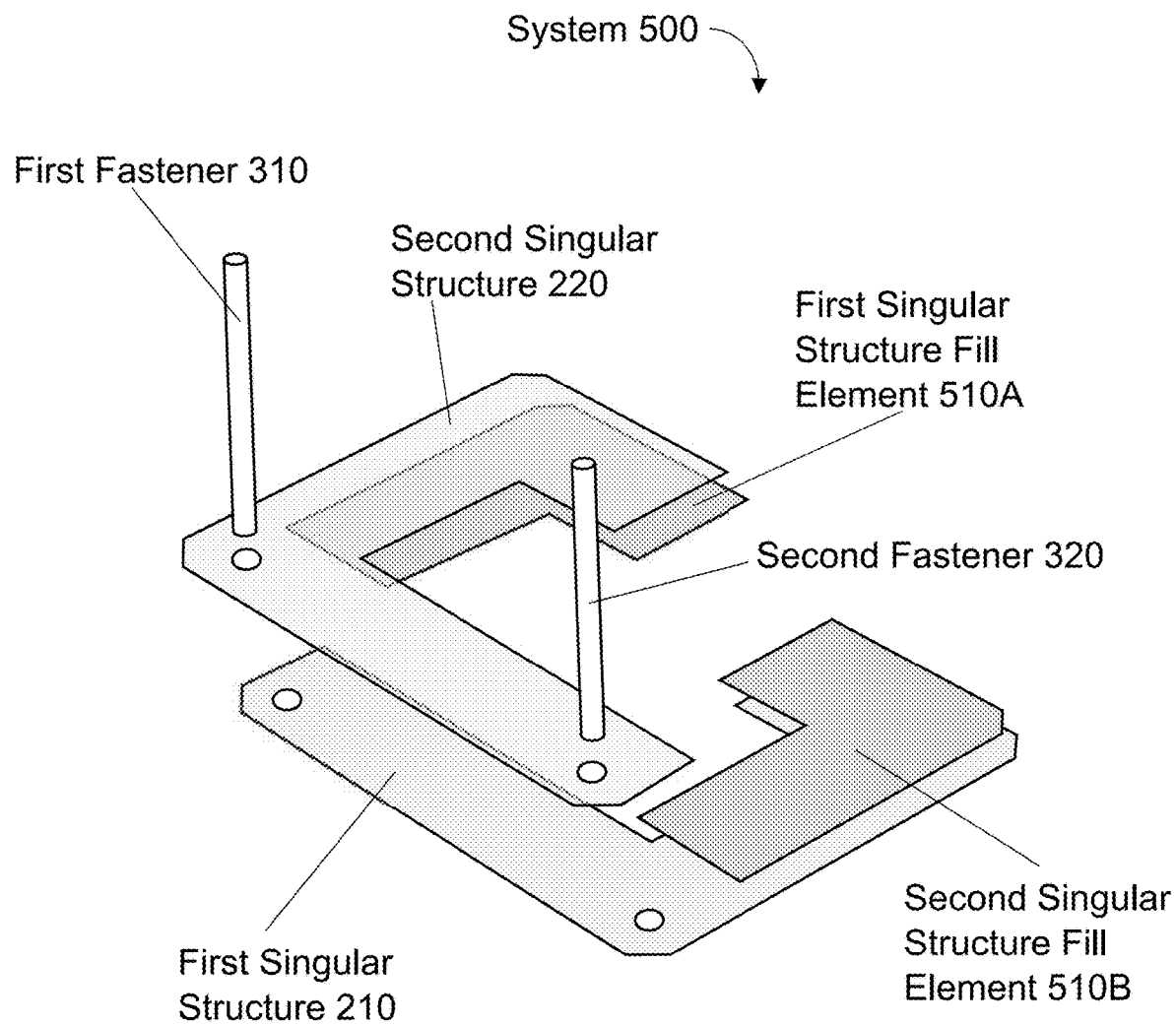
FIG. 5 illustrates one embodiment of a system comprising singular structures that stack with one another, a first singular structure fill element, a second singular structure fill element, a first fastener, and a second fastener.

FIG. 5 illustrates one embodiment of a system 500 comprising the first singular structure 210, the second singular structure 220, a first singular structure fill element 510A, and a second singular structure fill element 510B. The first and second singular structure fill elements 510A and 510B serve as place holders to support the singular structures 210 and 220 so that they remain in place. This can increase efficiency of the motor and/or generator by minimizing path resistance through which magnetic flux passes by increasing thickness uniformity. The thickness of the first and second singular structure fill elements 510A and 510B can be approximately equal to the thickness of the second member 210B of FIG. 2 and the fourth member 220B of FIG. 2.

As described above in FIG. 3, in one embodiment the singular structures 210 and 220 can be secured together by a first fastener 310 and a second fastener 320 (fasteners 310 and 320 can be configured so they are removable). Moreover, the second singular structure 220 can be secured to the first singular structure fill element 510A and the first singular structure 210 can be secured to the second singular structure full element 510B (e.g., secured by tack welding).

Figure 6A:
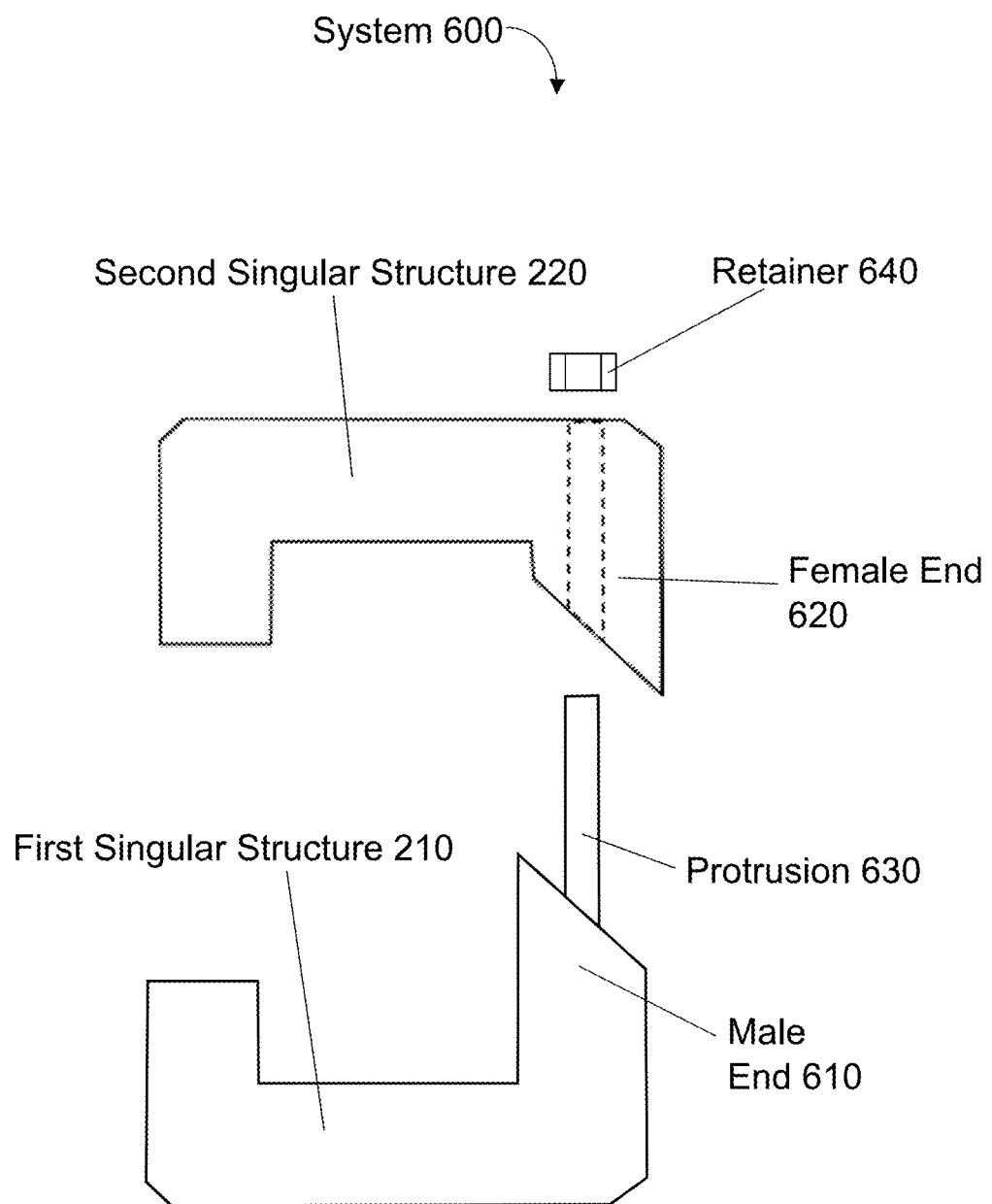
FIG. 6A illustrates one embodiment of a system comprising a first singular structure comprising a male end, a second singular structure comprising a female end, and a retainer.
Figure 6B:
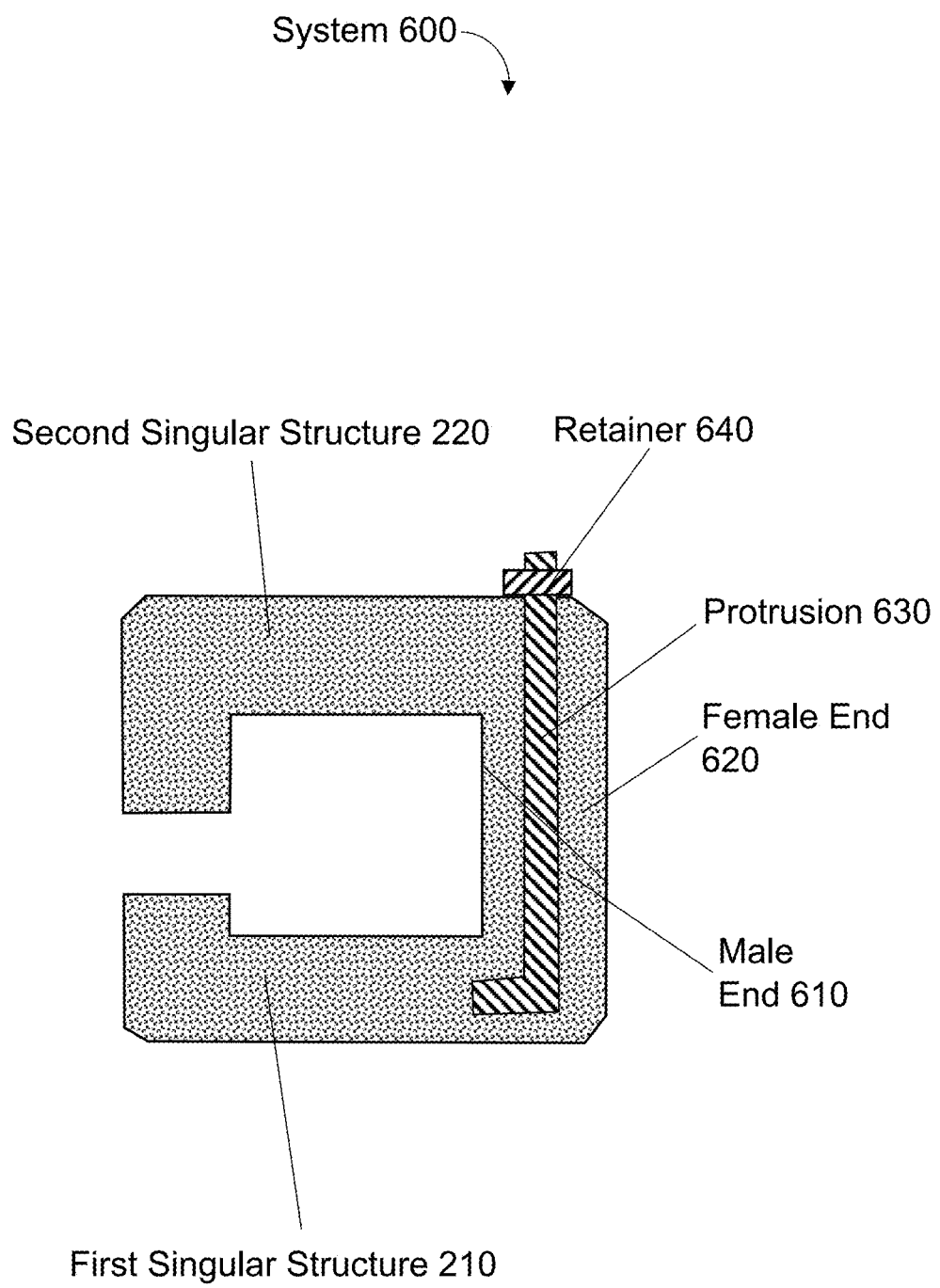
FIG. 6B illustrates one cross section embodiment of the system of FIG. 6A with the male end and the female end interlocked.

FIGS. 6A and 6B illustrate one embodiment of a system 600 comprising a portion of a magnetic core 110A or 110B of FIG. 1 that can interlock. FIG. 6A illustrates the system 600 with the singular structures 210-220 (e.g., solid cast singular structures) separated and FIG. 6B illustrates the system 600 with the singular structures 210-220 interlocked. The first singular structure 210 can comprise a male end 610 and the second singular structure 220 can comprise a female end 620. The male end 610 can comprise a protrusion 630. The male end 610 and the female end 620 can be designed to interlock to form a uniform portion of the magnetic core 110A or 110B of FIG. 1. FIG. 6B illustrates the protrusion 630 extending through the female end 620 and through the second singular structure 220. The interlocking can aid in reducing an air gap between solid hardware components of the magnetic core 110A or 110B of FIG. 1. Additionally, the interlocking can allow for ease in assembly and disassembly. As in the stacking design, the interlocking design can allow one to remove one or more singular structure(s) 160 of FIG. 1 without disturbing the coil 150A or 150B of FIG. 1 that can surround the part of the system 600 with the interlocking ends 610-620. The magnetic core 110A or 110B of FIG. 1 can be secured by a retainer 640, or similar device. In the event of damage to one or more singular structure(s), the retainer 640 can be removed, the damaged singular structure(s) can be removed, a new singular structure(s) can be installed, and the retainer 640 can be reinserted.

The rotor 120 of FIG. 1 can be configured to rotate the magnets 140A and/or 140B of FIG. 1 to generate a magnetic flux that flows through the magnetic core 110A and/or 110B of FIG. 1 to convert an energy. Magnetic cores can have differing physical structures (e.g., they can comprise singular structures that stack or interlock, as described as above.) Different structure types, such as one stacking and one interlocking, can be part of a single motor and/or generator.

The system 100 of FIG. 1 can be transposed (e.g., the system can comprise a second side). The second side can comprise a third singular structure, a fourth singular structure, a second coil 150B of FIG. 1, and a second magnet 140B of FIG. 1. The third singular structure can comprise a fifth member and a sixth member, which intersect at an angle significantly less than 180 degrees (e.g., 90 about degrees). The fourth singular structure can comprise a seventh member and an eighth member, which intersect at an angle significantly less than 180 degrees (e.g., about 90 degrees). The second magnet 140B can at a second edge of the rotor 120 of FIG. 1, and the rotor 120 of FIG. 1 can be configured to rotate the second magnet. This rotation can generate a magnetic flux that flows through the second magnetic core 110B of FIG. 1 to convert a second energy.

In one embodiment, the first member and the third member can stack with one another, as can the fifth member and the seventh member (in the case of an embodiment comprising two sides). In another embodiment, the first member and the third member can interlock with one another. The fifth member and the seventh member can also stack or can interlock.

In the embodiment in which singular structures can be stacked, the system can comprise a third fastener and a fourth fastener, which can be inserted substantially perpendicularly through the fifth member and the seventh member. Insertion of the third and the fourth fasteners outside of a first end and second end of a second coil can allow the third singular structure and/or the fourth singular structure to be removed (e.g., in the event of breakage) with relative ease.

In this embodiment, the fifth member and the seventh member individually can have a first thickness, the sixth member and the eighth member individually can have a second thickness, and the second thickness is about twice as thick as the first thickness. Using complementary thicknesses with the fifth/seventh member and sixth/eighth member can reduce an air gap that forms between solid components of the magnetic core. The reduction in the air gap can result in increased motor efficiency.

In another embodiment, the third singular structure can comprise a male end 610 (which can comprise a protrusion 630), and the fourth singular structure can comprise a female end 620. The male end 610 and the female end 620 can be designed to interlock to form a uniform portion of a second magnetic core 110B of FIG. 1 (e.g., interlocking shown in FIGS. 6A and 6B).

Figure 7:
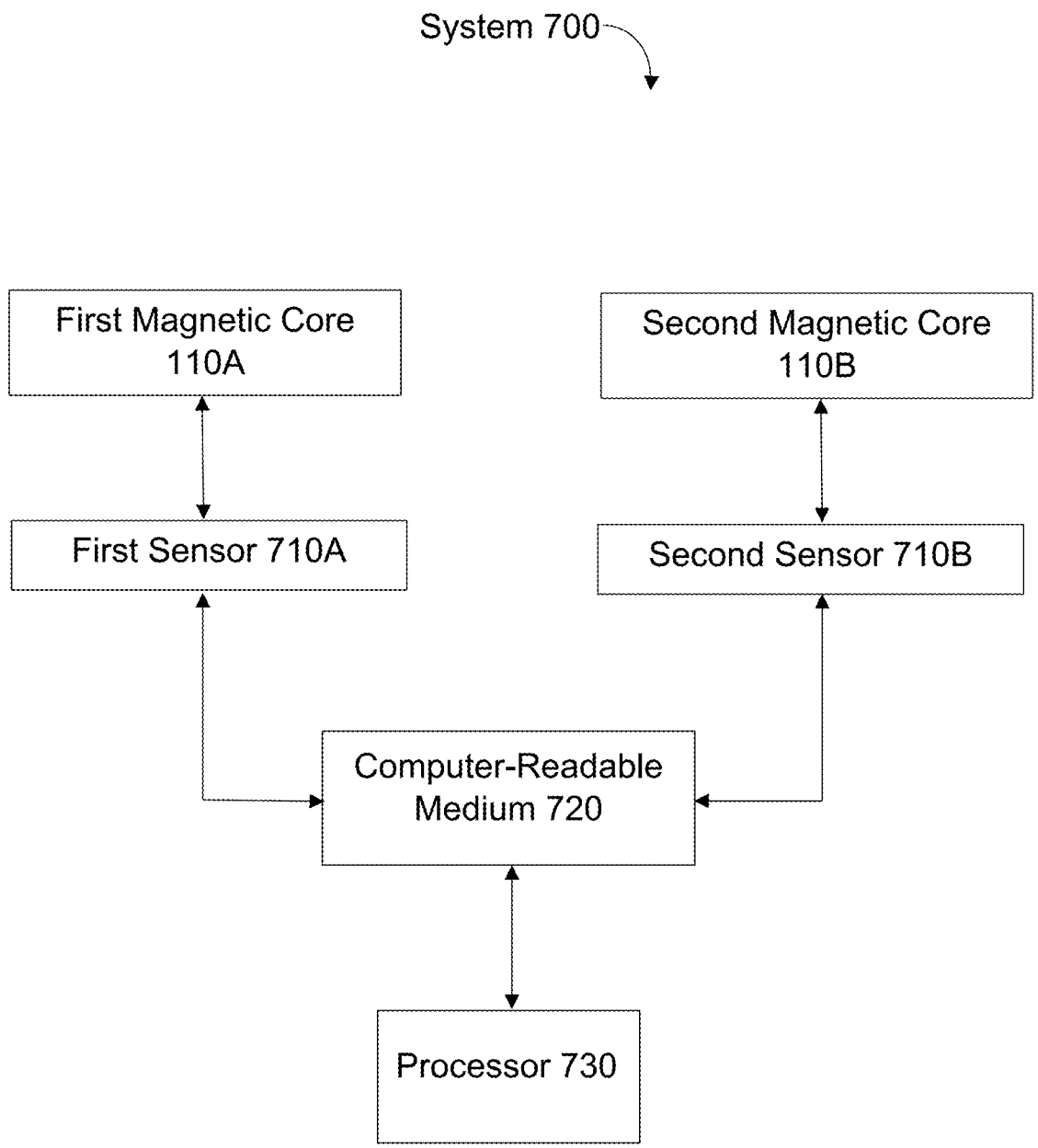
FIG. 7 illustrates one embodiment of a system comprising a first magnetic core, a second magnetic core, a first sensor, a second sensor, a computer-readable medium, and a processor.

FIG. 7 illustrates one embodiment of a system comprising the first magnetic core 110A, the second magnetic core 110B, a first sensor 710A, a second sensor 710B, a computer-readable medium 720, and a processor 730. The first sensor 710A can be configured to monitor the first magnetic core 110A and the second sensor 710B can be configured to monitor the second magnetic core 110B. The first sensor 710A can be configured to detect an operational failure in the first magnetic core 110A without an operational failure in the second magnetic core 110B (e.g., lower performance than desired in magnetic core 110A, but desired performance in magnetic core 110B, and vice versa). The first sensor 710A can be configured to produce a notification of the operational failure. In this regard, the correct magnetic core can be targeted for repair or replacement, thereby saving time and repair/replacement cost.

In normal operation, the first magnetic core 110A and the second magnetic core 110B can function with about the same current. When a failure occurs, the current can change beyond a threshold value. Therefore, the change in current can indicate a failure. The sensors 710A and 710B can function to identify the currents. The computer-readable medium 720 and the processor 730 (e.g., functioning as part of a computer control system) can compare the currents sensed by the sensors 710A and 710B to identify the failure.

The computer-readable medium 720 (e.g., a non-transitory computer-readable medium) can receive output of the sensors 710A and 710B. The computer-readable medium 720 can retain a component and/or instructions executed by the processor 730 and the component and/or instructions can be used in identification of a failing magnetic core.

Additionally, other components can be used and/or other implementations can be practiced outside of those illustrated herein, such as those for the system 700. In one example, a signal processor can function between the computer-readable medium 720 and the sensors 710A and 710B. The signal processor (e.g., that is part of the processor 730) can function as an analog-to-digital converter for the output of the first sensor 710A and the second sensor 710B. While two sensors 710A and 710B are illustrated (e.g., an individual sensor for an individual magnetic core) other implementations can be practiced, such as a single sensor for a motor and/or generator.

Figure 8:
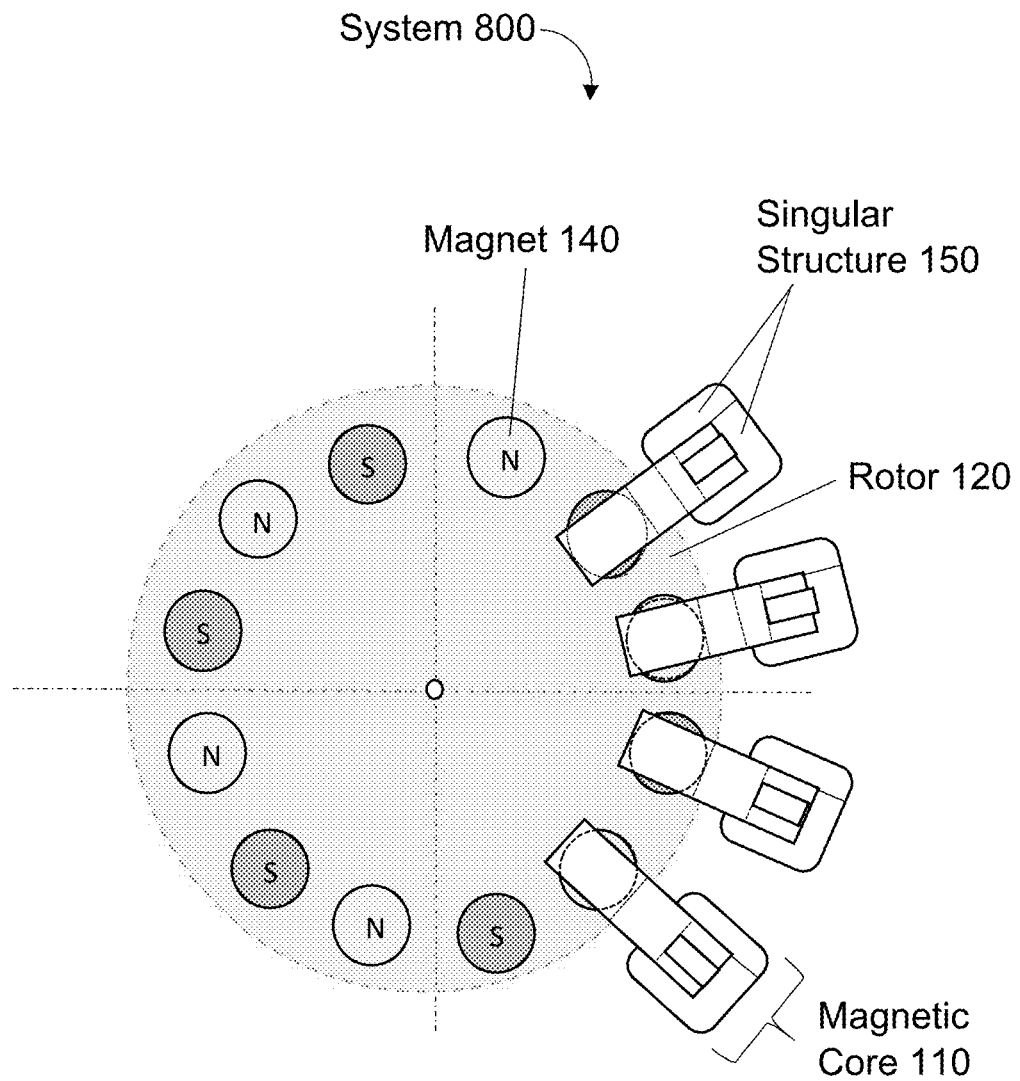
FIG. 8 illustrates a top view of an embodiment of a system comprising several magnetic cores and a rotor.

FIG. 8 illustrates one embodiment of a top-down view of a system 800 comprising multiple magnetic cores 110 (for the sake of illustration of the magnets 140 and their poles, four magnetic cores 110 are shown). The system 800 has the benefit of having a sensor set (e.g., the sensors 710A and 710B of FIG. 7) configured to detect an operational failure in the first magnetic core 110A of FIG. 7 without an operational failure in the second magnetic core 110B of FIG. 7. Magnetic core 110A of FIG. 7 can experience a failure, while magnetic core 110B of FIG. 7 can operate normally. In one example, using the sensors 710A and 710B of FIG. 7, as well as the computer-readable medium 720 of FIG. 7 can allow one to isolate the magnetic core for repair. Likewise, FIG. 8 also illustrates the benefit of having the sensor 710A of FIG. 7 produce a notification of the operational failure in the first magnetic core 110A of FIG. 7. The notification imparts information that can be used to make a decision to repair/replace the failing magnetic core 110A (e.g., remove and replace the singular structure).

The magnets 140 are illustrated with alternating poles. In one example for a motor, as the rotor 120 rotates, the magnets pass through the magnetic cores 110. This rotation of magnets 140 with alternating poles can cause conversion of the mechanical energy of the rotor 120 into electrical energy. The magnets 140 can be at the edge of the rotor 120. Being at the edge can be at the absolute edge of the rotor 120 (e.g., at the end of the radius), near the absolute edge, or away from the center.

Figure 9:
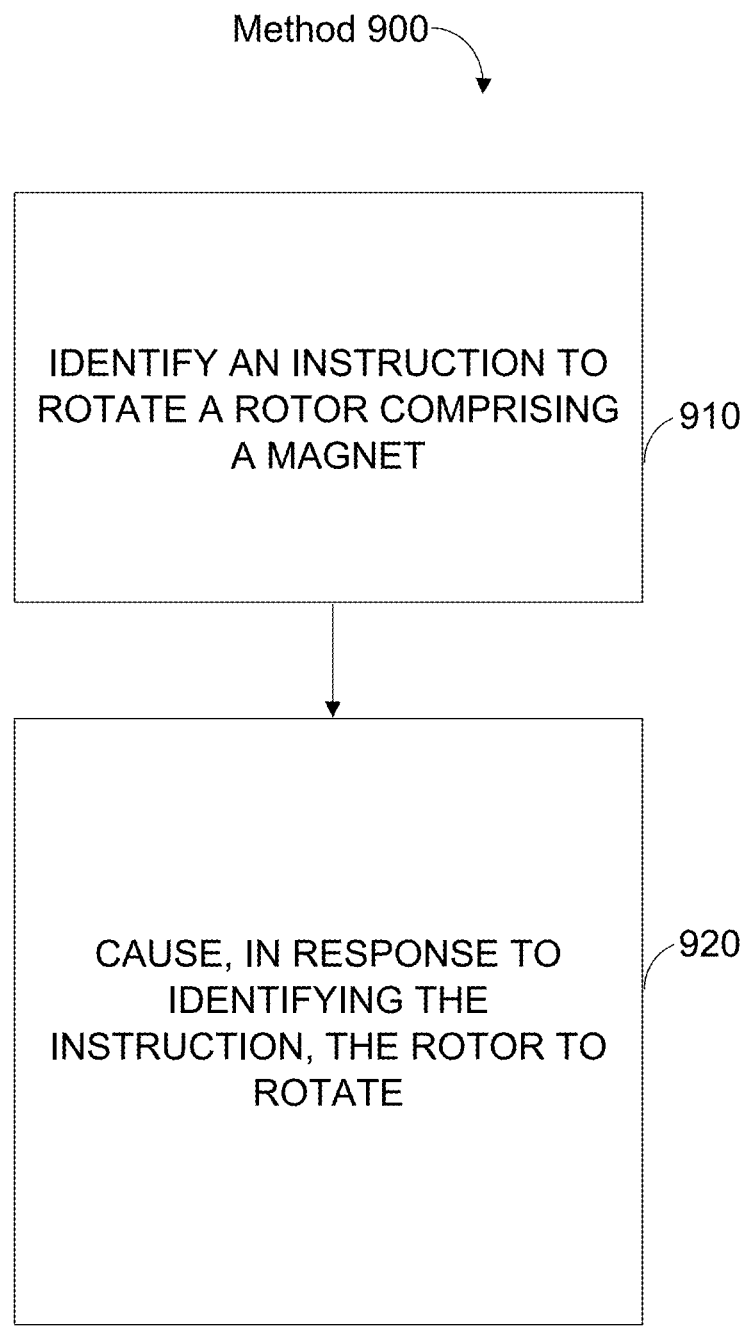
FIG. 9 illustrates one embodiment of a method comprising two actions.

FIG. 9 illustrates one embodiment of a method 900 that comprises two actions. At 910, there can be identifying an instruction to rotate a rotor comprising a magnet. At 920 (e.g., performed in response to 910), there can be causing the rotor to rotate. This rotation can cause a magnetic flux that provides an electric current that generates a voltage across a coil in a segmented core, in order to convert the mechanical energy of the rotation into an electrical energy. The segmented core can be constructed (e.g., stacked) as discussed in FIG. 3 or can be constructed (e.g., interlocked) as discussed in FIG. 6.

Figure 10:
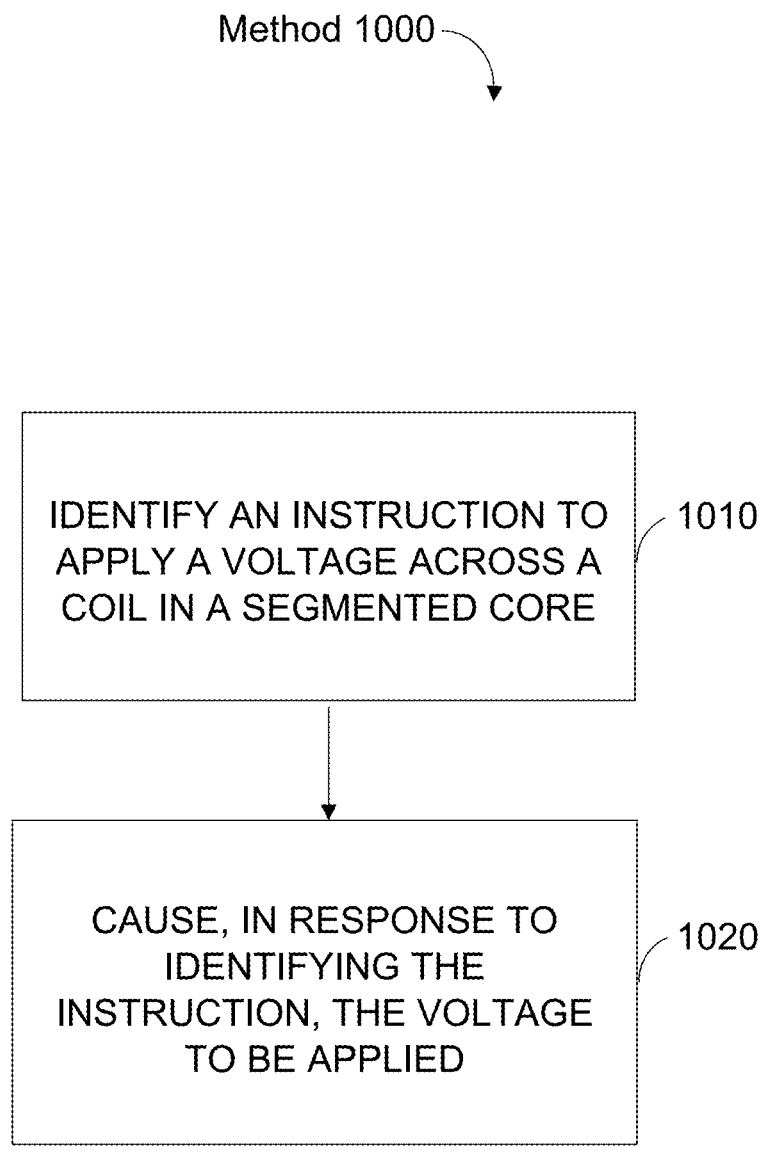
FIG. 10 illustrates one embodiment of a method comprising two actions.

FIG. 10 illustrates one embodiment of a method 1000 that comprises two actions. At 1010, there can be identifying an instruction to apply a voltage across a coil in a segmented core to while the second action can be applying the voltage. Applying the voltage can cause an electric current to flow through the coil, to produce a magnetic flux can occur at 1020. The magnetic flux can cause a rotor to rotate. This rotation can occur due to an impact of the magnetic flux on magnets of the rotor as the magnets pass through the segmented core. The segmented core can be constructed (e.g., stacked) as discussed in FIG. 3 or can be constructed (e.g., interlocked) as discussed in FIG. 6.

Figure 11:
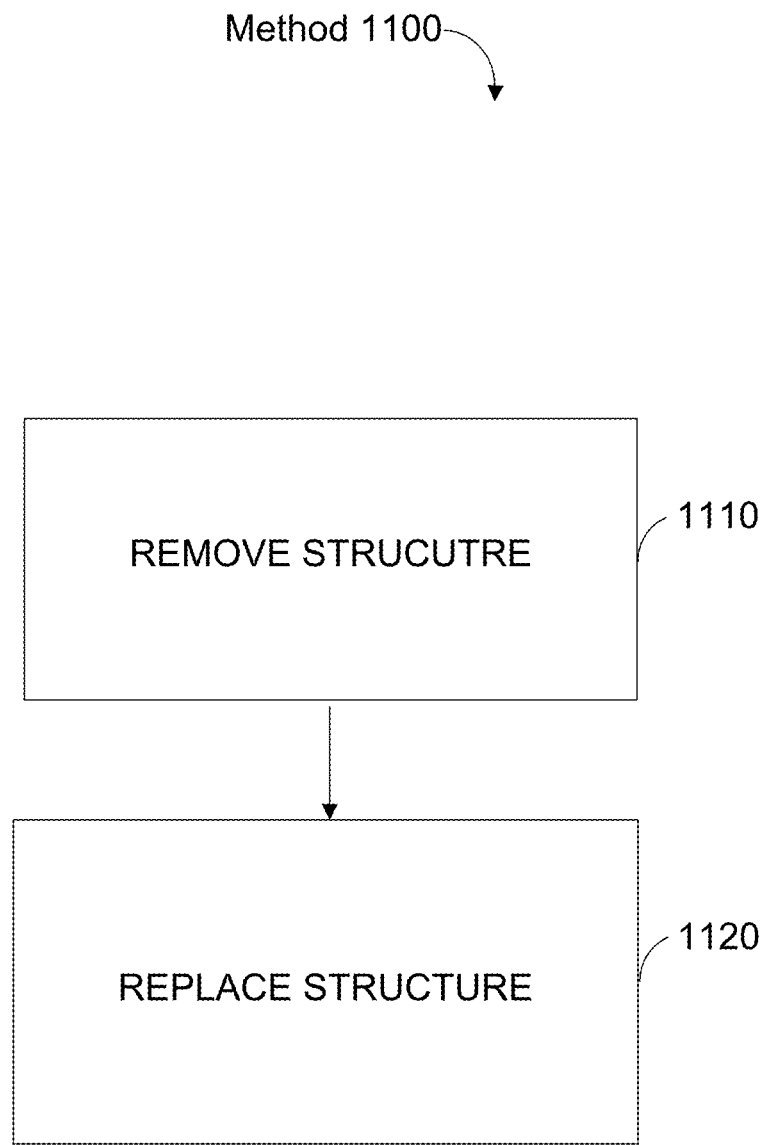
FIG. 11 illustrates one embodiment of a method 1100 that comprises two actions.

FIG. 11 illustrates one embodiment of a method 1100 (e.g., performed, at least in part, by a repair machine) that comprises two actions. At 1110, a singular structure can be removed. In one example, the method 1100 can be performed in an environment with the system 700 of FIG. 7. Through use of the system 700 of FIG. 7 a determination can be made that the first magnetic core 110A of FIG. 7 failed, such as the second singular structure 220 of FIG. 4 cracking. The cracked second singular structure 220 of FIG. 4 can be removed and replaced with a substitute second singular structure at 1120. The first singular structure 210 of FIG. 4 and the coil of FIG. 4 can be reused with the substitute second singular structure to create a replacement first magnetic core 110A of FIG. 7. In this, parts can be reused to lower costs when a failure occurs and the failure can be corrected with relative ease and speed.

What is claimed is:

1. A system, comprising:
a first singular structure comprising a first member and a second member; and
a second singular structure comprising a third member and a fourth member,
a first sensor configured to detect an operational failure in a first magnetic core,
where the first member and the second member intersect at an angle less than 180 degrees,
where the third member and the fourth member intersect at an angle less than 180 degrees,
where the first member and the third member are configured to align together to form part of the first magnetic core and
where the first member and the third member are configured to be at least partially surrounded by a coil to convert an energy,
where the first member comprises a male end,
where the third member comprises a female end,
where the male end and the female end interlock to form a uniform portion of the first magnetic core,
where a second sensor is configured to detect an operational failure in a second magnetic core,
where the first sensor is configured to detect an operational failure in the first magnetic core without there being an operational failure in the second magnetic core and
where the first sensor is configured to produce a notification, that is outputted, of the operational failure in the first magnetic core.

2. The system of claim 1, comprising:
a magnet, that is part of a rotor, that aligns with the second member and the fourth member to complete a loop of the first magnetic core,
where a voltage applied across the coil causes an electric current to flow through the first magnetic core to produce a magnetic flux that causes rotation of the rotor to occur by way of the magnet.

3. The system of claim 1, comprising:
a magnet, that is part of a rotor, that aligns with the second member and the fourth member to complete a loop of the first magnetic core, where the rotor is configured to rotate to cause a magnetic flux, which produces an electric current that generates a voltage across the coil.

4. The system of claim 1,
where the first singular structure and the second singular structure are removable from the system without physical disturbance of the coil that surrounds the first member and the third member.

5. A system, comprising:
a first singular structure comprising a first member and a second member; and
a second singular structure comprising a third member and a fourth member,
where the first member and the second member intersect at an angle less than 180 degrees,
where the third member and the fourth member intersect at an angle less than 180 degrees,
where the first member and the third member are configured to align together to form part of a magnetic core,
where the first member and the third member are configured to be at least partially surrounded by a coil to convert an energy,
where the first member comprises a male end,
where the third member comprises a female end,
where the male end and the female end interlock to form a uniform portion of the magnetic core,
where the male end protrudes through the female end and through the second singular structure, and
where the first singular structure and the second singular structure are coupled together.

6. The system of claim 5,
where the first member and the second member intersect at an angle of about 90 degrees and
where the third member and the fourth member intersect at an angle of about 90 degrees.

7. The system of claim 5,
where the first singular structure and the second singular structure are removable from the system without physical disturbance of the coil that surrounds the first member and the third member.

8. The system of claim 5, comprising:
a magnet, that is part of a rotor, that aligns with the second member and the fourth member to complete a loop of the magnetic core,
where a voltage applied across the coil causes an electric current to flow through the magnetic core to produce a magnetic flux that causes rotation of the rotor to occur by way of the magnet.

9. The system of claim 5, comprising:
a magnet, that is part of a rotor, that aligns with the second member and the fourth member to complete a loop of the magnetic core,
where the rotor is configured to rotate to cause a magnetic flux, which produces an electric current that generates a voltage across the coil.

10. A motor, comprising:
a first singular structure comprising a first member and a second member;
a second singular structure comprising a third member and a fourth member;
a coil;
a rotor comprising a magnet at a first edge; and
a first sensor configured to detect an operational failure in a first magnetic core,
where the first member and the second member intersect at an angle significantly less than 180 degrees,
where the third member and the fourth member intersect at an angle significantly less than 180 degrees,
where the first member and the third member are configured to align together to form part of the first magnetic core,
where the first member and the third member are configured to be at least partially surrounded by the coil,
where the first singular structure and the second singular structure are configured to be removed from the first magnetic core without disassembling another magnetic core of the motor,
where application of a voltage across the coil causes an electric current to flow through the coil and produce a magnetic flux such that the rotor rotates to convert an electrical energy into a mechanical energy,
where the first member comprises a male end,
where the third member comprises a female end,
where the male end and the female end interlock to form a uniform portion of the first magnetic core,
where a second sensor is configured to detect an operational failure in a second magnetic core,
where the first sensor is configured to detect an operational failure in the first magnetic core without there being an operational failure in the second magnetic core, and
where the first sensor is configured to produce a notification, that is outputted, of the operational failure.

11. The motor of claim 10,
where the first singular structure and the second singular structure are removable from the system without physical disturbance of the coil that surrounds the first member and the third member.

12. A generator, comprising:
a first singular structure comprising a first member and a second member;
a second singular structure comprising a third member and a fourth member;
a coil;
a rotor comprising a magnet at a first edge; and
a first sensor configured to detect an operational failure in a first magnetic core,
where the first member and the second member intersect at an angle significantly less than 180 degrees,
where the third member and the fourth member intersect at an angle significantly less than 180 degrees,
where the first member and the third member are configured to align together to form part of the first magnetic core,
where the first member and the third member are configured to be at least partially surrounded by the coil,
where the first singular structure and the second singular structure are configured to be removed from the first magnetic core without disassembling another magnetic core associated with the generator,
where the rotor is configured to rotate to cause a magnetic flux, which produces an electric current that generates a voltage across the coil such that mechanical energy of the rotor rotation is converted into electrical energy as the voltage,
where the first member comprises a male end,
where the third member comprises a female end,
where the male end and the female end interlock to form a uniform portion of the first magnetic core,
where a second sensor is configured to detect an operational failure in a second magnetic core, where the first sensor is configured to detect an operational failure in the first magnetic core without there being an operational failure in the second magnetic core, and where the first sensor is configured to produce a notification, that is outputted, of the operational failure.

13. The generator of claim 12, where the first singular structure and the second singular structure are removable from the system without physical disturbance of the coil that surrounds the first member and the third member.

14. The generator of claim 12, comprising:

a third singular structure comprising a fifth member and a sixth member;

a fourth singular structure comprising a seventh member and a eighth member; and a second coil such that the coil is a first coil, where the second magnetic core comprises third singular structure, the fourth singular structure, and the second coil, where the another magnetic core associated with the generator is the second magnetic core, where the fifth member and the sixth member intersect at an angle significantly less than 180 degrees, where the seventh member and the eighth member intersect at an angle significantly less than 180 degrees, where the fifth member and the seventh member are configured to align together to form part of the second magnetic core, where the fifth member and the seventh member are configured to be at least partially surrounded by the second coil, where the third singular structure and the fourth singular structure are configured to be removed from the second magnetic core without disassembling the first magnetic core, and where the rotor is configured to rotate to cause a magnetic flux, which produces an electric current that generates a voltage across the second coil such that mechanical energy of the rotor rotation is converted into electrical energy as the voltage.

15. A generator, comprising:

a first singular structure comprising a first member and a second member;

a second singular structure comprising a third member and a fourth member;

a coil; and a rotor comprising a magnet at a first edge, where the first member and the second member intersect at an angle significantly less than 180 degrees, where the third member and the fourth member intersect at an angle significantly less than 180 degrees, where the first member and the third member are configured to align together to form part of the first magnetic core, where the first member and the third member are configured to be at least partially surrounded by the coil, where the first singular structure and the second singular structure are configured to be removed from the first magnetic core without disassembling another magnetic core associated with the generator, where the rotor is configured to rotate to cause a magnetic flux, which produces an electric current that generates a voltage across the coil such that mechanical energy of the rotor rotation is converted into electrical energy as the voltage, where the first member comprises a male end, where the third member comprises a female end, where the male end and the female end interlock to form a uniform portion of the first magnetic core, where the male end protrudes through the female end and through the second singular structure, and where the first singular structure and the second singular structure are coupled together.

16. The generator of claim 15, where the first singular structure and the second singular structure are removable from the system without physical disturbance of the coil that surrounds the first member and the third member.

17. A motor, comprising:

a first singular structure comprising a first member and a second member;

a second singular structure comprising a third member and a fourth member;

a coil; and a rotor comprising a magnet at a first edge, where the first member and the second member intersect at an angle significantly less than 180 degrees, where the third member and the fourth member intersect at an angle significantly less than 180 degrees, where the first member and the third member are configured to align together to form part of a magnetic core, where the first member and the third member are configured to be at least partially surrounded by the coil, where the first singular structure and the second singular structure are configured to be removed from the magnetic core without disassembling another magnetic core of the motor, where application of a voltage across the coil causes an electric current to flow through the coil and produce a magnetic flux such that the rotor rotates to convert an electrical energy into a mechanical energy where the first member comprises a male end, where the third member comprises a female end, where the male end and the female end interlock to form a uniform portion of the magnetic core where the male end protrudes through the female end and through the second singular structure, and where the first singular structure and the second singular structure are coupled together.

18. The motor of claim 17, where the first singular structure and the second singular structure are removable from the system without physical disturbance of the coil that surrounds the first member and the third member.

19. A motor, comprising:

a first singular structure comprising a first member and a second member;

a second singular structure comprising a third member and a fourth member;

a coil; and a rotor comprising a magnet at a first edge, where the first member and the second member intersect at an angle significantly less than 180 degrees, where the third member and the fourth member intersect at an angle significantly less than 180 degrees, where the first member and the third member are configured to align together to form part of a magnetic core, where the first member and the third member are configured to be at least partially surrounded by the coil, where the first singular structure and the second singular structure are configured to be removed from the magnetic core without disassembling another magnetic core of the motor, where application of a voltage across the coil causes an electric current to flow through the coil and produce a magnetic flux such that the rotor rotates to convert an electrical energy into a mechanical energy, where the first member comprises a male end, where the third member comprises a female end, where the male end and the female end interlock to form a uniform portion of the magnetic core, where the magnet is a first magnet at the first edge, where the rotor comprises a second magnet opposite the first edge, where a first magnet has a first pole configuration that is configured to align with the second member and the fourth member to complete a loop of the magnetic core, where a second magnet has a second pole configuration that is configured to align with the second member and the fourth member to complete a loop of the magnetic core, where the first pole configuration and the second pole configuration are opposite one another, and where the rotor is configured to rotate such the first magnet and the second magnet pass through the magnetic core to cause a magnetic flux, which produces an electric current that generates a voltage across the coil.

20. The motor of claim 19, where the first singular structure and the second singular structure are removable from the system without physical disturbance of the coil that surrounds the first member and the third member.

\* \* \* \* \*